Patented June 29, 1948

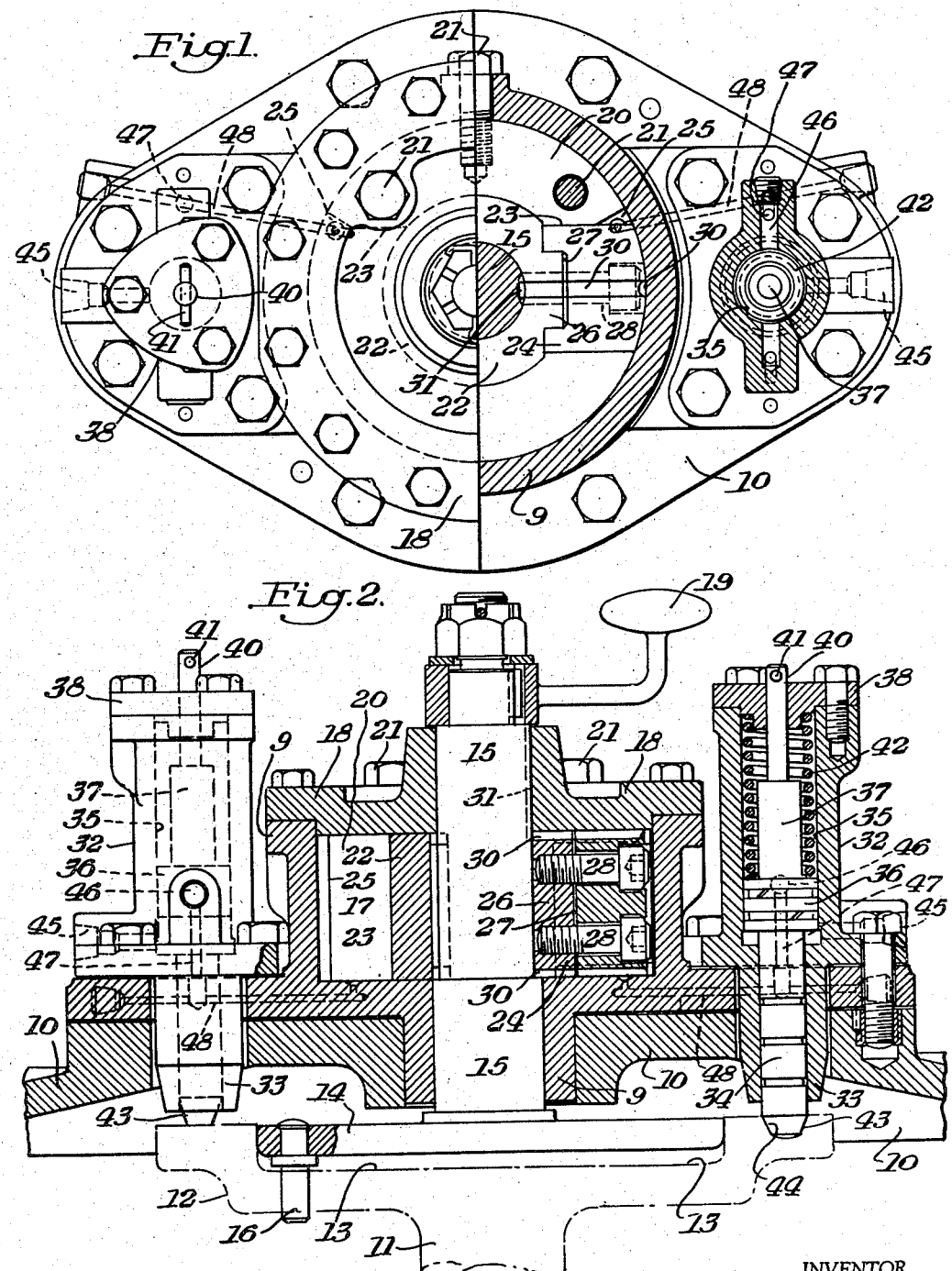

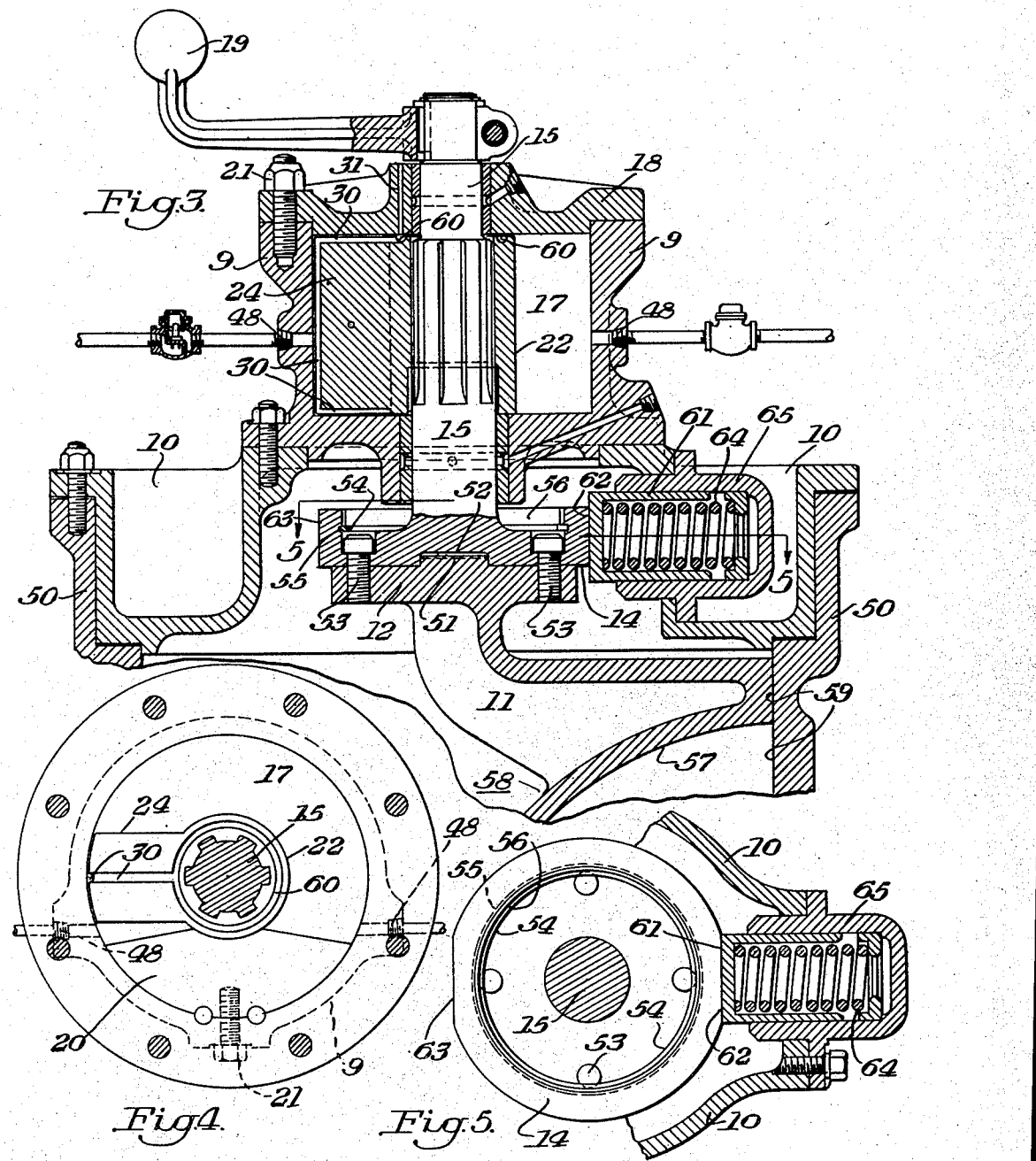

2,444,391

UNITED STATES PATENT OFFICE 2,444,391

FLUID MOTOR OPERATED VALVE

Joseph E. Whitfield, Hamilton, Ohio

Application January 12, 1943, Serial No. 472,133

11 Claims. (Cl. 137—139)

This invention relates generally to expansible chamber motors and more particularly to a servo-motor for actuating a reversing valve by fluid under pressure which unlocks the valve before energizing the motor to move the valve.

The servo-motor is particularly adaptable for use in operating a reversing valve which controls the flow of scavenging or supercharging air produced by a screw blower for a reversible Diesel engine wherein the blower is driven directly from the shaft of the engine.

The principal object of this invention is the provision of a servo-motor, the expansible chamber of which has a direct discharge for venting the actuating and entrapped fluid and for cushioning the movement of the motor.

Another object is the provision of a servo-motor for actuating a valve which is first unlocked by the actuating fluid before the motor is energized.

Another object is the provision of a servo-motor having an automatic locking means for arresting the movement of the motor at the end of the stroke.

Another object is the provision of a servo-motor having an interlock preventing the simultaneous application of fluid under pressure to both sides of the motor vane.

Other objects and advantages appear in the following description and claims.

In the accompanying drawings practical embodiments illustrating the principles of this invention is shown wherein:

Fig. 1 is a plan view with a part in section of the servo-motor comprising this invention.

Fig. 2 is a vertical sectional view of the servo-motor showing the valve stem locked in one position.

Fig. 3 is a vertical sectional view of a servo-motor having a modified lock for the rotary parts.

Fig. 4 is a plan view of the structure shown in Fig. 3 with the cover removed.

Fig. 5 is a horizontal sectional view taken on the line 5—5 of Fig. 3.

Referring to Figs. 1 and 2 of the drawing the housing 9 of the servo-motor is mounted on the top or cover 10 of the valve casing which contains the valve to be operated. This valve is disclosed in United States Letters Patent No. 2,345,780 and is employed to reverse the flow of air from a screw blower that is directly driven by a Diesel engine when the latter is operated in the opposite direction. The reversing valve operates in a cylindrical chamber and is supported at its lower end in a step bearing and the upper end is attached to the servo-motor as disclosed herein and in said patent. The upper portion of the vertical shaft or gudgeon 11 of the valve is axially aligned with the cover 10 and has an enlarged flange 12 formed integral therewith. The flange 12 is provided with an upwardly open annular recess 13 arranged to receive the disk 14 which is integral with the lower end of the servo-motor rotor shaft 15.

Fitted dowels 16 extend through and are secured to the disk 14 and are arranged to seat in aligned openings through the enlarged flange 12 to rotatably connect the valve gudgeon 11 with the servo-motor shaft 15. When the cover 10 and the servo-motor mounted thereon are removed as a unit from the valve casing the disk 14 is raised out of the recess 13 and the dowels 16 are withdrawn from their seats in the openings of the flange 12, thereby disconnecting the servo-motor from the valve.

The motor shaft 15 extends up through the motor chamber 17 and is journaled in the head 18. Thus the journals of the shaft 15 of the servomotor serve as the upper journal of the reversing valve. A handle 19 is fixed to the outer end of the shaft 15 for manually rotating the motor and the valve in case no air supply is available.

A portion of the motor chamber 17 is occupied by the stationary abutment 20 which is secured to the head 18 by the bolts 21.

The abutment 20 is arcuate in shape with the outer cylindrical surface engaging a portion of the wall of the chamber 17 and the inner cylindrical surface mating with a portion of the hub 22 of the rotor thus confining the chamber 17 to an arcuate shape somewhat greater than a semi-cylindrical section. A portion of the ends of the abutment 20 is flattened as indicated at 23 to engage the sides of the motor blade or vane 24. The outer portions of the ends of the abutment are faced on radial planes to provide prism shaped spaces 25 with the motor vane for the introduction of fluid under pressure.

The hub 22 is fixed to the shaft 15 and is provided with an axially disposed key-like projection 26 arranged to be engaged by the mating slot 27 on the inner edge of the vane 24 which is secured thereto by the bolts 28. The outer surface of the vane 24 is arcuate to mate with the wall of the chamber 17.

The three edges of the vane do not engage the adjacent top, bottom and side walls of the chamber 17 but are provided with a slight clearance therewith to prevent wear and to permit fluid under pressure to flow therebetween. An interconnecting groove 30 is provided in the three edges of the vane and the corresponding portion of the hub 22 and joins the vertical groove 31 in shaft 15 which extends up through the head 18 to the atmosphere. Thus any fluid under pressure that passes through the clearance between the vane and the walls of the chamber 17 is discharged through the passageway 30 and 31 directly to the atmosphere.

The operating mechanism which locks the valve and controls the admission of fluid under pressure to each side of the motor vane is duplicated on each side of the motor and is enclosed in separate housings 32 arranged to be bolted to the cap 10. Each housing has an extension 33 that projects through openings in the cap 10 and is bored to receive the locking plunger 34. The upper portion of the housing 32 is provided with an enlarged bore 35 axially aligned with the small bore through the housing extension 33 and arranged to receive the piston head 36 of the locking plunger 34.

The locking plunger 34 has a sliding fit with the bore 35 in the housing extension 33 and is provided with a series of labyrinth grooves for checking the leakage of fluid under pressure from the enlarged bore of the housing. The piston head 36 is provided with piston rings for sealing with the enlarged bore.

A projection 37 is provided on the other end of the piston head of the locking plunger and is arranged to engage the end wall 38 that encloses the enlarged bore, thus limiting the upward travel of the locking plunger. An extension 40 on the end of the projection 37 extends through the end wall 38 and is provided with a transverse pin 41 which may be grasped and raised to manually operate the locking plunger 34. A helical spring 42 is inserted under initial compression between the end wall 38 and the piston head 36 to normally maintain the latter in its lowermost position.

The locking plunger 34 projects below the housing extension 33 and is provided with a beveled nose 43 arranged to mate in the upwardly open socket 44 in the top face of the flange 12. The socket 44 is cut in the flange 12 to properly position the valve when engaged by the nose of the locking plunger. Thus the locking plunger 34 and the socket 44 together with the vane 24 and the end of the abutment 20 act as stops for limiting the movement of the valve. The locking plunger 34 which is not energized or in engagement with the socket 44 rides on the top surface of the flange 12 thereby providing a braking action to the movement of the valve.

The fluid under pressure for actuating the servo-motor to rotate the valve is introduced through the port 45 at the side of the locking plunger which enters the bore 35 below the piston head 36. The fluid under pressure forces the piston head upwardly compressing the spring 42 and unseating the nose 43 of the locking plunger from the socket 44. When the nose 43 has cleared the flange 12 the piston head 36 uncovers the lateral port 46 in the bore 35 which leads to the vertical passage 47 in the casting 32. The vertical passage in turn connects with the horizontal passageway 48 in the housing 9 which opens at its inner end into the prism shaped chamber 25 between the abutment 20 and the vane 24.

If the fluid pressure is sufficient to raise the locking plunger 34 it will be adequate to force the servo-motor vane to its opposite position, thereby rotating the shaft 15 to shift the valve or other mechanically operated apparatus.

The fluid in front of the moving vane has no means of escape through its associated locking plunger and it is compressed until the pressure is sufficient to force it through the clearance between the vane and the walls of the chamber to the groove 30 where it is directed through the passageway 31 to the atmosphere. The pressure required to force the fluid through the vane clearance acts as a dampener having the tendency to cushion the action of the vane. Again the fluid under pressure which moves the vane also forces some of the fluid through the vane clearance to the atmosphere which is in the nature of a leak or loss which also has a retarding effect on the movement of the vane.

Thus there are three separate and independent functions that provide a dampening and cushioning action on the movement of the motor, the spring pressed locking plunger, the entrapped fluid ahead of the moving motor vane and the leakage of the impelling fluid around the vane.

The leakage path to the atmosphere from around the three edges of the motor vane prevents the fluid under pressure from accumulating ahead of the vane which would have the effect of locking its movement in mid stroke. This is an important object of this invention.

If it is necessary to operate the valve manually the cross pin 41 is grasped and raised to lift the locking plunger from the socket 44. The valve may then be rotated manually by swinging the crank handle 19 through an arc of 180°.

A control valve is employed to selectively admit fluid under pressure to one of the locking plungers at a time and thus avoid any possibility of admitting fluid under pressure to both sides of the motor vane. This control valve may be actuated manually or by the Diesel engine reversing mechanism with the proper time delays for synchronizing the movement of the vane relative to the reversal of direction of the engine.

Referring now to Figs. 3, 4 and 5 of the drawing, the housing 9 of the servo-motor is mounted on the top or cover 10 of the valve casing 50. The upper end of the valve shaft or gudgeon 11 is provided with a flat flange 12 having an upwardly extending hub 51 which mates with a corresponding recess 52 in the underside of the disk 14 which is formed integral with the servo-motor shaft 15. The dowels 16 have been replaced by the bolts 53 which are screwed into tapped holes through the flange 12 and are held by the snap ring 54 which fits in the groove 55 cut in the wall of the recess 56 in the top of the disk 14.

The upper end of the bonnet section 57 of the valve 58 is shown in Fig. 3. The outer or cylindrical sealing edge 59 of the upper bonnet section 57 has a clearance fit in the bore of the valve casing 50 to provide a seal therewith.

The motor vane 24 and hub 22 in this structure are made of a single piece of material having an outer cylindrical surface which mates with the cylindrical wall surface of the motor chamber 17, but the three edges of the vane 24 are provided with sufficient clearance with the chamber walls to permit the passage of fluid under pressure. The machine shop practice for tolerance between metal parts having relative movement is sufficient for producing the leakage between the motor vane and the case. The groove 30 in the bottom, side and top edges of the vane 24 connect with the annular groove 60 cut in the top of the hub 22, which in turn mates with the vertical groove 31 in the cover 18 that permits the fluid under pressure in the chamber 17 to escape to the atmosphere.

The valve structure shown in Figs. 3 to 5 is not provided with dual locking plungers but a single friction lock plunger 61 arranged to bear against the flattened faces 62 and 63 on the side of the disk 14. The plunger 61 is relatively large in diameter to permit it to engage the broad flat surfaces 62 and 63 and is constantly urged against the rim of the disk 14 by the spring 64. The plunger 61 fits in the bore of the plunger casing 65 that is bolted in an opening through the valve top 10.

The fluid under pressure is admitted to the chamber 17 on each side of the vane 24 through the passages 48 in the walls of the casing 9 adjacent the abutment 20. The fluid is admitted to the chamber 17 by a three-way valve which is not shown, but the selection is determined by swinging the control handle in one direction or the other with the intermediate position closing the control valve to prevent fluid from entering either side of the chamber 17.

The flattened sides 62 and 63 of the disk 14 are positioned relative to the valve 58 so that the pressure of the friction locking plunger 61 acting on the flattened surface 63 locks the valve sealing surface 59 in alignment with the mating sealing surface in the valve casing 50. When the air pressure on the underside of the valve bonnet 57 is greater than the air pressure on the top of the bonnet the valve will tend to raise. The position of the valve 58 under this condition would be opposite to that shown in Fig. 3. When the valve is in the position illustrated in Fig. 3 of the drawings the air pressure is greater on top of the bonnet than it is on the underside and the valve will be forced down. The valve 58 may chatter under conditions where ordinary tolerances of general shop practice permit it to vibrate in the casing when subjected to a pulsating fluid under pressure. The plunger 61 acting at right angles to the axis of the valve dampens or eliminates this vibratory action. Again the friction of the lower valve stem bearing also aids in reducing or eliminating chattering. The dampening or elimination of chattering is an important object of this invention and has particular advantages in installations of this character for the control of scavenging air in submarine Diesel engines.

The flat friction locking surfaces 62 and 63 offer a considerable resistance against the rotation of the valve. Thus the fluid pressure acting on the vane 24 must build up, in spite of the leakage through the grooves 30 in the edges of the vane, until it is sufficiently strong to overcome the cam action of the friction surfaces and plunger 61 in compressing the spring 64. It has been found that a fluid pressure which is sufficient to overcome this friction lock is also sufficient to quickly rotate the valve through 180°, thus providing a snap action in the operation of the valve. This is also an important object of this invention as it eliminates additional structure formerly employed to obtain this result.

This improved servo-motor may be employed for actuating apparatus other than the valve as disclosed herein, which per se is the subject matter of a co-pending application.

I claim:

1. In an expansible chamber motor the combination of a casing having an enclosed chamber therein, a vane movable within the chamber and dividing it into two independent sections, an inlet at the end of each section for admitting fluid under pressure which moves the vane from one end of the chamber to the other, an outlet carried by the vane having restricted communication with the chamber sections but constantly open to the exterior of the chamber for discharging fluid from one section when the other section is energized by a fluid under pressure, and means operated by the movement of the vane.

2. The structure of claim 1 in which the restricted communication between each chamber section and the outlet is substantially the same.

3. The structure of claim 1 in which the restricted communication to the outlet in the vane simultaneously discharges fluid under pressure from both sides of the vane.

4. The structure of claim 1 in which the restricted communication to the outlet in the vane permits the simultaneous discharge of fluid before the advancing vane and a portion of the fluid under pressure that causes the vane to move.

5. The structure of claim 1 in which the restricted communication is formed by the clearance between the vane and the walls of the chamber.

6. The structure of claim 1 in which the outlet in the vane includes a connecting groove in the edges thereof that leads to the exterior of the chamber.

7. The structure of claim 1 in which the outlet in the vane is defined by a connecting groove in the edges thereof that leads to the exterior of the chamber and in which the restricted communication is defined by the clearance between the vane and the chamber walls on each side of the groove.

8. The structure of claim 1 which also includes a shaft extending into the chamber for rotatably supporting the vane, a circular flange on the shaft outside of the chamber arranged to move with the vane and having spaced interrupted surfaces, and a pressure biased plunger having a mating surface arranged to engage the first mentioned surface and lock the shaft and the vane in selected positions, the locking pressure of the plunger being overcome by the movement of the vane.

9. The structure of claim 1 which also includes a shaft extending into the chamber for rotatably supporting the vane, a circular flange on the shaft arranged to move with the vane and having seats corresponding to selected positions of the vane, and a pressure biased plunger arranged to engage said seats to lock the shaft and vane in selected positions.

10. In a reversing valve for controlling the flow of air from a blower, the combination of a valve housing having a valve chamber therein with opposed openings to the blower and opposed inlet and outlet openings, a bearing in one end of the chamber, a reversing valve in the chamber supported at one end by said bearing, a shaft extending into the other end of the chamber, coupling means connecting the shaft to the adjacent end of the valve for supporting and operating the latter, seats on said coupling means corresponding to the positions of the valve relative to said openings, and a pressure biased plunger arranged to engage a selected seat on the coupling means for holding the valve in the corresponding position and dampening the vibratory movement of the valve.

11. In a fluid motor operated valve the combination of a valve housing having a valve chamber therein with inlet and outlet openings, a bearing in one end of the chamber, a valve in the chamber supported at one end by said bearing, a fluid motor mounted adjacent the other end of the chamber, said motor having a shaft extending into the chamber, coupling means connecting the shaft of the motor with the adjacent end of the valve for supporting and operating the latter, seats on said coupling means corresponding to the positions of the valve relative to said openings, and a pressure biased plunger arranged to engage a selected seat on the coupling means for holding the valve in the corresponding position and for dampening vibratory movement of the valve.

JOSEPH E. WHITFIELD.

REFERENCES CITED

The following references are of record in the file of this patent:

UNITED STATES PATENTS

| Number | Name | Date |
|---|---|---|
| 836,317 | Gerdes | Nov. 20, 1906 |
| 840,796 | Oakman | Jan. 8, 1907 |
| 840,877 | Steedman | Jan. 8, 1907 |
| 1,018,961 | Cofield | Feb. 27, 1912 |
| 1,081,784 | Spohrer | Dec. 16, 1913 |
| 1,139,221 | Potter | May 11, 1915 |
| 1,287,273 | Fisher | Dec. 10, 1918 |
| 1,355,832 | Heffernan | Oct. 19, 1920 |
| 1,643,753 | Slatkry | Sept. 27, 1927 |
| 1,646,631 | Schnyder | Oct. 25, 1927 |
| 1,745,387 | Strehler | Feb. 4, 1930 |
| 1,772,773 | Forman | Aug. 12, 1930 |
| 1,826,330 | Thiele | Oct. 6, 1931 |
| 1,847,688 | Couwanhoven | Mar. 1, 1932 |
| 1,980,325 | Down | Nov. 13, 1934 |
| 1,984,828 | Fornwalt | Dec. 18, 1934 |
| 2,039,186 | Pieper | Apr. 28, 1936 |
| 2,053,668 | Kinzie | Sept. 8, 1936 |
| 2,054,258 | Kinzie | Sept. 15, 1936 |
| 2,130,618 | Gnavi | Sept. 20, 1938 |
| 2,181,562 | Ganahl | Nov. 28, 1939 |
| 2,233,840 | Koehler | Mar. 4, 1941 |

FOREIGN PATENTS

| Number | Country | Date |
|---|---|---|
| 202,814 | Great Britain | Aug. 30, 1923 |